R. N. ADAMS.
Rotary Cultivator.
No. 63,451. Patented Apr. 2, 1867.
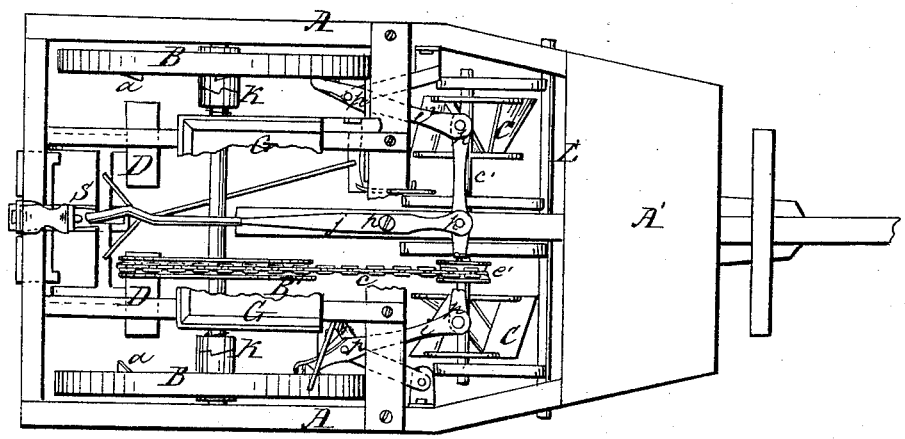
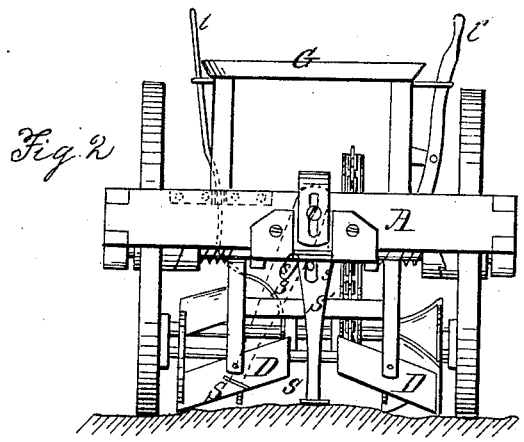

United States Patent Office.

ROBERT N. ADAMS, OF GREENFIELD, OHIO.

*Letters Patent No* 63,451, *dated April* 2, 1867.

---

IMPROVEMENT IN COTTON CULTIVATOR.

---

*The Schedule referred to in these Letters Patent and making part of the same.*

---

TO ALL WHOM IT MAY CONCERN:

Be it known that I, ROBERT N. ADAMS, of Greenfield, in the county of Highland, and State of Ohio, have invented a new and improved Machine for Cultivating Cotton, which I denominate "Adams's Labor-Saving Cotton Cultivator;" and I do hereby declare that the following is a full, clear, and exact description of the same, reference being had to the accompanying drawings, and to the letters of reference marked thereon.

Figure 1 is a plan view of my machine; and

Figure 2 is a rear elevation of the same.

Like letters refer to the same parts in both figures.

A is the main frame, and B B the large driving-wheels. C C are two revolving hoes, having three helical blades each, both mounted on one axle, C', and rotated by means of an endless chain, $c$, passing around pulley $c'$ on said axle C', and also round a larger wheel, B', on the axle of the driving-wheels. D D are two scrapers, which follow the revolving hoes to smooth down the earth and destroy any weeds which may have escaped destruction by the revolving hoes. The machine is to straddle a row of cotton, so that one of the revolving hoes and one of the scrapers will pass on each side of the row. S is a thinner, consisting of a two-edged steel blade of suitable width, about fifteen inches long, which is suspended in a horizontal position by an arm, S', pivoted to the centre of the cross-beam of the main frame. Said thinner is made to vibrate to the right and left at regular intervals as the machine moves forward, by means of inclined cogs, $a\ a$, on the main driving-wheels, acting upon a jointed or hinged frame, consisting of a cross-bar, $i$, two side-bars, $i^1$ and $i^2$, and a centre-bar, $j$. These bars all turn on pivots indicated by the letter $p$. The rear ends of the arms $i^1$ and $i^2$ are so arranged that each of the inclined cogs on the main driving-wheels must, as said wheels revolve, strike one of said arms and force it inwards. There are three of said cogs on each driving-wheel, so arranged that they will strike the arms $i^1$ and $i^2$ alternately, at regular intervals. The rear end of the centre-bar $j$ passes through a slot, $s$, in the pivoted arm S', by which the thinner is suspended. When one of the inclined cogs on the right-hand driving-wheel comes in contact with the arm $i^1$ it will force the rear end of said bar inward, and it is manifest that this must cause the rear end of the centre-bar $j$ to vibrate to the left, carrying the thinner S in the same direction, as shown by red lines in fig. 2; and when the next succeeding cog on the left-hand wheel comes in contact with arm $i^2$, it will by the same means cause the rear end of the arm $j$ and the thinner S to vibrate towards the right. By this means the thinner is caused to make regular strokes to the right and left as the machine advances, and at each stroke it will cut out all the cotton plants in the row which the machine straddles for a space equal to the length of the blade. If it be desired to leave the plants in hills, three inches in length and fifteen inches apart, according to the usual practice, the blade of the thinner should be fifteen inches long, and the machine so geared that it will make one stroke to eighteen inches forward movement of the machine. If it be desired to leave hills of more or less than three inches in length, this can be accomplished by substituting a shorter or longer blade for the thinner. G is the driver's seat, shown broken away in the centre in fig. 1, to exhibit the machinery underneath it. Levers $l$ and $l'$ are for operating familiar mechanism to throw the machine out of gear and to elevate the hoes and scrapers when it is desired to move the machine without operating them. The driving-wheels are made to rotate their axle, when the machine is moving forward, by means of clutches, $k\ k$, but when the machine backs the wheels will rotate independently of the axle. The front end of the machine is supported on two truck-wheels, not shown in the drawings, being covered by the platform A'. The circular hoes are suspended in a supplemental frame, turning on a rock-shaft, L, having its bearings in the main frame, as the hoes are elevated or depressed. The scrapers should be set to run as near the row as practicable, with their outer ends inclining a little downward, to prepare the ridges for the operation of the thinner; and a slight twist may be given to the scrapers, similar to that in the mould-board of a plough, so that the tendency will be to draw the earth toward the row of cotton, forming a more perfect ridge.

What I claim as my invention, and desire to secure by Letters Patent, is—

1. The rotating hoes, in combination with the endless chain and the two pulley-wheels B' and $c'$, constructed and arranged substantially as described.

2. I claim the thinner S, in combination with the inclined cogs on the driving-wheels and the intermediate machinery by which a vibrating motion is given to said thinner, substantially as described.

3. In combination with the vibrating thinner and the revolving hoes, I claim the scrapers D D, constructed and arranged substantially as described.

ROBERT N. ADAMS.

Witnesses:
WILLIAM H. IRWIN,
FURMAN W. PIERSON.